United States Patent
Koskiahde et al.

(10) Patent No.: US 7,269,166 B2
(45) Date of Patent: Sep. 11, 2007

(54) TRANSMISSION OF A BINDING UPDATE MESSAGE INDICATING A CARE OF ADDRESS FOR DELIVERING DATA PACKETS TO A MOBILE NODE VIA A UNIDIRECTIONAL INTERFACE

(75) Inventors: Timo Koskiahde, Seinajoki (FI); Mika Lepisto, Tampere (FI)

(73) Assignee: Nokia Corporation, Espoo (FI)

( * ) Notice: Subject to any disclaimer, the term of this patent is extended or adjusted under 35 U.S.C. 154(b) by 680 days.

(21) Appl. No.: 10/493,918

(22) PCT Filed: Nov. 27, 2001

(86) PCT No.: PCT/EP01/13842

§ 371 (c)(1),
(2), (4) Date: Apr. 26, 2004

(87) PCT Pub. No.: WO03/047183

PCT Pub. Date: Jun. 5, 2003

(65) Prior Publication Data

US 2004/0246939 A1 Dec. 9, 2004

(51) Int. Cl.
*H04L 12/28* (2006.01)

(52) U.S. Cl. .............. 370/352; 370/355; 709/230; 455/404.02; 455/440; 455/450; 455/456.1; 455/464

(58) Field of Classification Search ............... 370/352, 370/355–356, 365; 709/230, 246, 249; 455/404.02, 455/434, 435.1, 440, 450, 456.1, 456.3, 456.6, 455/464
See application file for complete search history.

(56) References Cited

U.S. PATENT DOCUMENTS

| | | | | |
|---|---|---|---|---|
| 6,473,411 B1 * | 10/2002 | Kumaki et al. | ............. | 370/331 |
| 7,151,758 B2 * | 12/2006 | Kumaki et al. | ............. | 370/331 |
| 2002/0007414 A1 | 1/2002 | Inoue et al. | ................ | 709/230 |
| 2002/0191562 A1 * | 12/2002 | Kumaki et al. | ............. | 370/331 |
| 2003/0018715 A1 * | 1/2003 | O'Neill | ....................... | 709/204 |
| 2003/0104814 A1 * | 6/2003 | Gwon et al. | ................ | 455/436 |
| 2004/0125795 A1 * | 7/2004 | Corson et al. | .............. | 370/356 |

FOREIGN PATENT DOCUMENTS

| | | |
|---|---|---|
| EP | 1 193 951 A2 | 4/2002 |
| WO | WO 00/18155 | 3/2000 |
| WO | WO 01/76286 A1 | 10/2001 |

OTHER PUBLICATIONS

*Dynamic Host Configuration Protocol*, R. Droms, Bucknell University, (Oct. 1993).

* cited by examiner

*Primary Examiner*—Binh K. Tieu
(74) *Attorney, Agent, or Firm*—Lackenbach Siegel, LLP; Robert M. Bauer, Esq.

(57) ABSTRACT

A method and system for delivering data packets from a network node to a mobile node, wherein a unidirectional interface to the mobile node is detected and a binding update indicating a care-of-address being an address of said detected unidirectional interface is transmitted to the network node. In response to this binding update request, data packets are delivered via the unidirectional interface. Thus, the performance of communication can be increased considerably by using a high bandwidth unidirectional broadcast network to deliver downlink data.

22 Claims, 2 Drawing Sheets

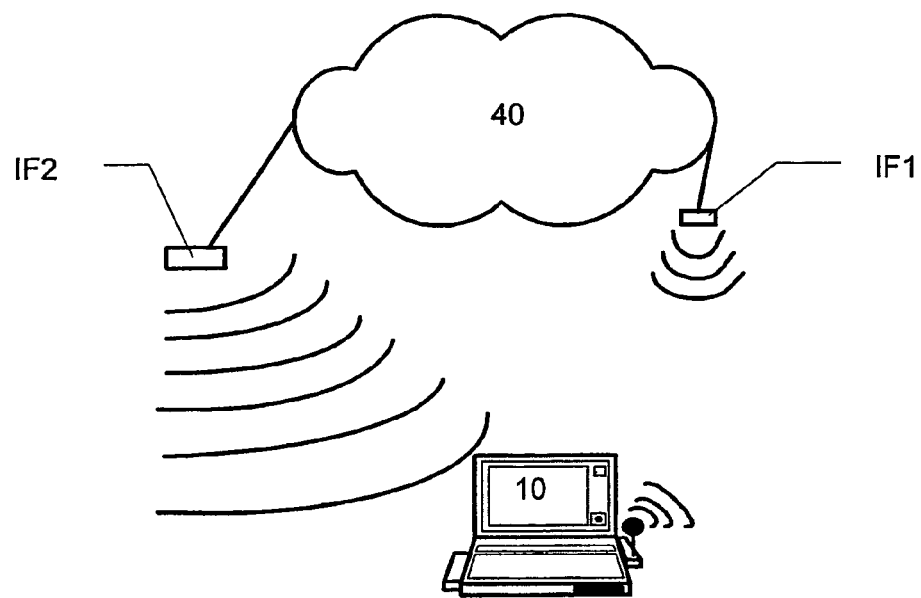
Fig. 3
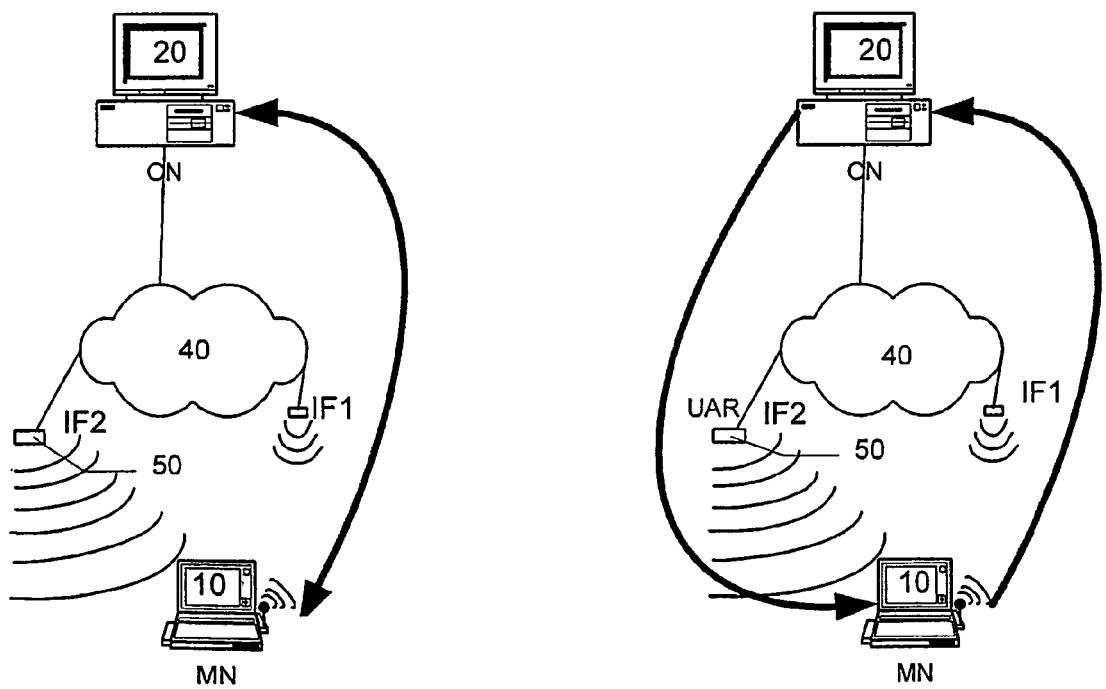
Fig. 4A  Fig. 4B

TRANSMISSION OF A BINDING UPDATE MESSAGE INDICATING A CARE OF ADDRESS FOR DELIVERING DATA PACKETS TO A MOBILE NODE VIA A UNIDIRECTIONAL INTERFACE

FIELD OF THE INVENTION

The present invention relates to a method and system for delivering data packets from a network node of a packet data network, such as an IP network, to a mobile node, e.g. a mobile terminal device.

BACKGROUND OF THE INVENTION

Mobility support for Internet devices is quite important, since mobile computing is getting more widespread. It is expected that the number of mobile computers will increase dramatically. Furthermore, there are already first products of cellular phones offering IP (Internet Protocol) services based on WAP (Wireless Application Protocol) or GPRS (General Packet Radio Services), and their number will increase rapidly. Cellular devices of the $3^{rd}$ generation will be packet switched devices instead of circuit switched devices. Therefore, IP services on $3^{rd}$ generation cellular devices will be an integral part in the future.

Today, several problems have to be faced making roaming with mobile Internet devices difficult. The problems start if somebody disconnects his mobile device from the Internet in order to connect it elsewhere. Normally, he would not be able to continue communication until he configures the system with a new IP address, the correct net mask and a new default router.

This problem is based on the routing mechanisms which are used in the Internet. IP addresses define a kind of topological relation between the linked computers. Today's versions of Internet protocols assume implicitly that a node has always the same point of attachment to the Internet. Additionally, the node's IP address identifies the link on which the node resides. If a node moves without changing its IP address, there is no information in its network address about the new point of attachment to the Internet.

To support mobile devices, which dynamically change their access points to the Internet, the Internet Engineering Task Force (IETF) currently standardizes a protocol supporting mobile Internet devices, called Mobile IP. There are two variations of Mobile IP, namely Mobile IPv4, based on IPv4 (Internet Protocol version 4), and Mobile IPv6, based on IPv6 (Internet Protocol version 6). The latter one is described in David W. Johnson and Charles Perkins, Mobility Support in IPv6, Internet Draft, 2000. Further information on the IPv6 can be obtained from IETF specification RFC 2460, 1998.

Mobile IPv6 allows an IPv6 host to leave its home subnet while transparently maintaining all of its present connections and remaining reachable to the rest of the Internet. This is realized in Mobile IPv6 by identifying each node by its static home address, regardless of its current point of attachment to the Internet. While a mobile node is away from home it sends information about its current location to a home agent on its home link. The home agent intercepts packets addressed to the mobile node and tunnels them to the mobile node's present location. This mechanism is completely transparent for all layers above IP, e.g. for TCP (Transmit Control Protocol), UDP (User Datagram Protocol) and of course for all applications. Therefore, domain name server (DNS) entries for a mobile node refer to its home address and don't change if the mobile node changes its Internet access point. In fact, Mobile IPv6 influences the routing of packets but is independent of the routing protocol itself.

The solution given by Mobile IPv6 consists of creating a so-called care-of-address whenever a node changes its point of attachment to the web. The care-of-address is an IP address associated with a mobile node while visiting a foreign link. The subnet prefix of this IP address is a foreign subnet prefix. Among the multiple care-of-addresses that a mobile node may have at a time (e.g. with different subnet pre-fixes), the one registered with the mobile nodes home agent is called its "primary" care-of-address. A care-of-address' can be derived from the receipt of router advertisements in a so-called "stateless address auto-configuration" as described in S. Thomson and T. Narten, "IPv6 Stateless Address Auto-Configuration", IETF specification RFC 2462, 1998, or can be assigned by a DHCP (Dynamic Host Configuration Protocol) server in a so-called "stateful address auto-configuration". Mobile nodes are always identified by their (static) home address regardless of their current point of attachment to the Internet. While away from home each mobile node has an additional (temporary) address which identifies its current location. Thus, basically messages that arrive at the original home address are redirected or tunneled to the care-of-address.

Mobile IPv6 requires the exchange of additional information. All new messages used in Mobile IPv6 are defined as IPv6 destination options. These options are used in IPv6 to carry additional information that needs to be examined only by a packet destination node. In particular, a binding update option is used by a mobile node to inform its home agent or any other correspondent node about its current care-of-address. A binding acknowledgement option is used to acknowledge the receipt of a binding update, if an acknowledgement was requested. Furthermore, a binding request option is used by any node to request a mobile node to send a binding update with the current care-of-address. Finally, a home address option is used in a packet sent by a mobile node to inform the receiver of this packet about the mobile node's home address. If a packet with the home address option is authenticated then the home address option must also be covered by this authentication.

Due to the asymmetric nature of communications in the IP networks, the use of unidirectional links provides a way to improve network performance and capacity. Unidirectional links might be used to deliver downlink data, but the problem is that this option is not supported natively in IP networks.

SUMMARY OF THE INVENTION

It is therefore an object of the present invention to provide a method and system for delivering data packets to a mobile node by using uni-directional links, by means of which the resource utilization and/or performance of communication can be increased.

This object is achieved by a method of delivering data packets from a network node of a packet data network to a mobile node, said method comprising the steps of:

detecting a unidirectional interface to said mobile node;

transmitting to said network node a binding update indicating a care-of-address, said care-of-address being an address of said detected unidirectional interface; and delivering said data packets from said network node to said mobile node via said unidirectional interface in response to said binding update.

Furthermore, the above object is achieved by a system for delivering data packets from a network node of a packet data network to a mobile node, wherein said mobile node is arranged to detect a unidirectional interface, and to transmit to said network node a binding update indicating a care-of-address, said care-of-address being an address of said detected unidirectional interface; and wherein said network node is arranged to deliver said data packets via said unidirectional interface in response to said binding update.

Additionally, the above object is achieved by a mobile node for receiving data packets from a packet data network, wherein said mobile node is arranged to detect a unidirectional interface to said mobile node, and to transmit to said network node a binding update indicating a care-of-address, said care-of-address being an address of said detected unidirectional interface.

Accordingly, unidirectional channels can be used to boost the performance of unicast communications, such as deliveries of downlink data in IP networks. Thereby, the performance of communications and the resource utilization can be increased considerably by using a high bandwidth unidirectional link to deliver the downlink data.

Another care-of-address associated with said mobile node while visiting a foreign link may be registered, said other care-of-address being an address of a bidirectional interface to said mobile node. Preferably, the other care-of-address is configured as a primary care-of-address registered with the home agent of said mobile node. Thus, the multi-homing feature already supported in the Mobile IPv6 protocol can be used for implementing the present dual care-of-address scheme.

The detecting step may be based on a router advertisement, that may contain predetermined information to inform about the unidirectionality of the link.

A message indicating that the mobile node is unreachable may be sent if problems occur during the delivering step, wherein said binding by said care-of-address may be deleted in response to said message, and the data packets may be delivered via the home agent of the mobile node. Thereby, the bi-directional link via the other care-of-address can be used if there are any problems in the unidirectional channel.

Furthermore, a new binding update request may be transmitted in order to change the other care-of-address. The mobile node may thus change the care-of-address used in the connection whenever it decides so by sending a new binding update request with the home address or a different care-of-address.

An access list indicating allowed users of the unidirectional interface may be maintained at the packet data network, e.g. at a unidirectional access router. Then, an authenticated binding update procedure can be used to open a communication channel between the mobile node and the unidirectional access router providing the unidirectional interface. Thereby, the mobile node can authorize itself by sending a binding update to the unidirectional access router, which address may be resolved from router advertisements.

Preferably, an information about network parameters of the unidirectional interface may be obtained from a lower protocol layer. The information may comprise an information about free bandwidth, costs and/or reliability of the connection via the unidirectional interface.

Furthermore, an information about a binding deletion in the network node may be obtained from the data packets received by the mobile node.

A predetermined information may be added to a router advertisement to inform the mobile node about the unidirectionality and/or specific parameters of the unidirectional interface. In this case, the specific parameter may comprise a congestion situation, wherein a congestion flag may be added to the router advertisement. This congestion flag may be set when the free bandwidth has dropped below a predetermined threshold.

BRIEF DESCRIPTION OF THE DRAWINGS

In the following, the present invention will be described in greater detail on the basis of preferred embodiments with reference to the accompanying drawings in which:

FIG. 3 shows a mobile node configured as a multi-homed node with two network interfaces; and FIGS. 4A and 4B show data flows using a primary packet route between a mobile node and a correspondent node, and using a primary packet route with a secondary care-of-address, respectively.

DESCRIPTION OF THE PREFERRED EMBODIMENT

Figure 1:
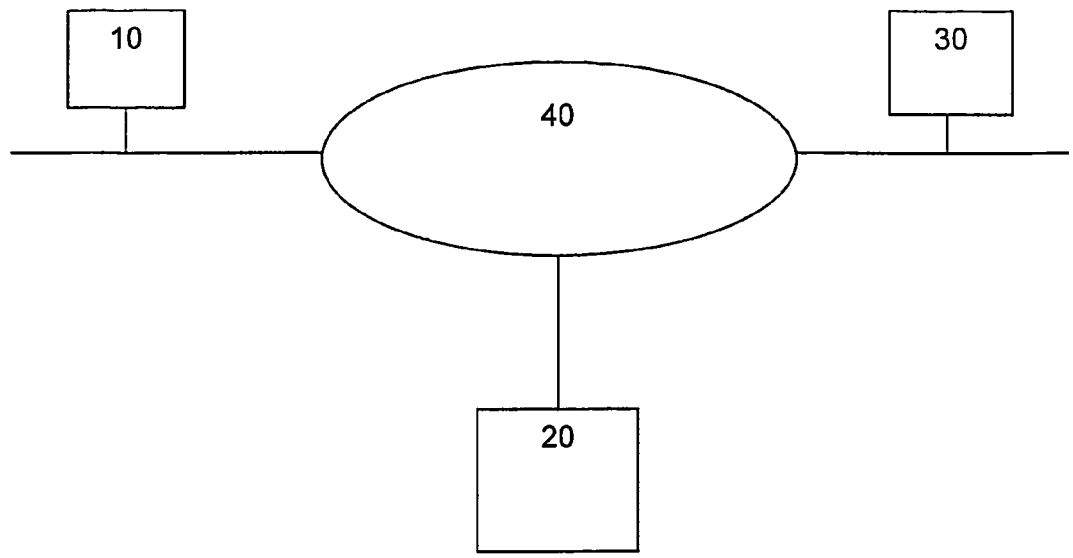
FIG. 1 shows a network architecture in which the present invention can be applied.

The preferred embodiment will now be described on the basis of a Mobile IPv6 architecture as shown in FIG. 1.

According to FIG. 1, the mobile IPv6 architecture includes three specific network elements, a mobile node 10 which can change its point of attachment from one link to another, while still being reachable via its home address, a home agent 30 which is a router on the mobile nodes home link with which the mobile node 10 has registered its current care-of-address, and a correspondent node 20 which is a network node with which the mobile node 10 is communicating. The correspondent node 20 may be either a mobile node or a stationary node. While the mobile node 10 is away from its home location, the home agent 30 intercepts packets on the home link destined to the mobile nodes home address, encapsulates them, and tunnels them to the mobile node's registered care-of-address. Among the multiple care-of-addresses which the mobile node 10 may have at a time (e.g., with different subnet prefixes), the one registered with the mobile nodes home agent 30 is called its "primary" care-of-address. The home link corresponds to the link on which the mobile nodes home subnet prefix is defined. Standard IP routing mechanisms will deliver packets destined for the mobile nodes home address to its home link. A foreign link is any link other than the mobile nodes home link. The home subnet prefix corresponds to the IP subnet prefix corresponding to the mobile nodes home address.

The mobile node 10, the home agent 30, and the correspondent node 20 are connected to a packet data network, e.g. an IP network 40 such as the Internet. A movement of the mobile node 10 corresponds to any change in the mobile nodes point of attachment to the IP network 40 such that it is no longer connected to the same link as it was previously. If the mobile node 10 is not currently attached to its home link, the mobile node 10 is said to be "away from home".

When the mobile node 10 moves away from its home network, it sends a binding update (BU) to its home agent 30. The BU is used to associate the identity (home address) of the mobile node 10 to its current location (care-of-address), i.e. to configure a care-of-address at the home agent 30. After receiving of the BU, the home agent 30 sends a binding acknowledgement (BA) to the mobile node 10.

Then, a binding is created for the mobile node 10 in the home agent 30. If the home agent 30 wants to communicate with the mobile node 10, it sends an IP packet with the care-of-address as destination address and places the home address, i.e. the address to which the connection is initiated, to the routing header. After receiving the packet, the mobile node 10 moves the home address from the routing header to the IP packet destination address. If the correspondent node 20 sends an IP packet to the mobile node 10, the home agent 30 intercepts the packet and then tunnels (IP tunnel) it to the mobile node 10. After having received the tunneled packet, the mobile node 10 sends a BU to the correspondent node 20 and after that the IP packets are routed directly from the correspondent node 20 to the mobile node 10 as with the home agent 30 above.

In the Mobile IPv6 protocol, a multi-homed node is considered as a host with several physical and/or logical interfaces to the IP network, of which it can use one or more for communication at a time. Used interfaces can be chosen e.g. according to the free bandwidth, reliability and/or cost. Multi-homing is implemented by supporting multiple care-of-addresses, wherein one of the care-of-addresses should be chosen as a primary care-of-address associated to the home address of the home agent 30.

Unidirectional channels, e.g. unidirectional broadcast channels, can be used to boost the performance of a unicast communication, such as the delivery of downlink data. According to the preferred embodiment, the mobile node 10 is arranged to detect an operational unidirectional interface so as to configure a new care-of-address for this unidirectional interface, e.g. by sending a BU to the home agent 30 and/or a correspondent node 20. The new care-of-address can now be used for communication, but of course only in the downlink direction, i.e. the mobile node 10 can only receive packets with the new care-of-address of the unidirectional interface.

Figure 2:
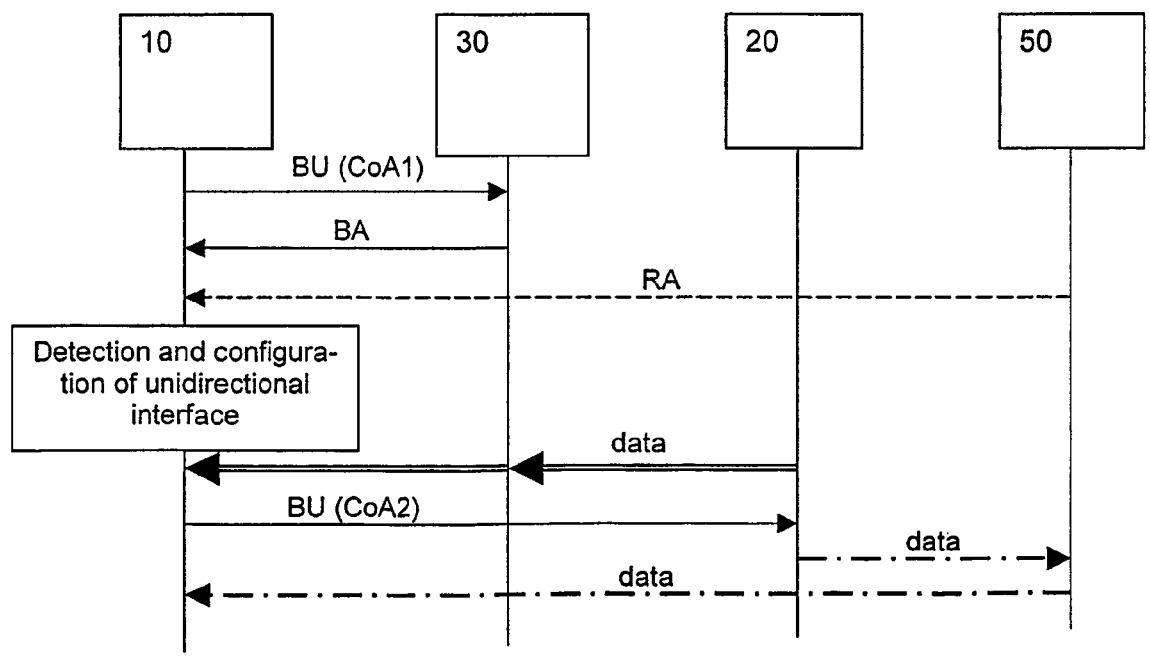
FIG. 2 shows a signaling diagram indicating the delivery of downlink data according to the preferred embodiment of the present invention.

In a case where the mobile node 10 has both uni- and bi-directional interfaces available, a signaling procedure as indicated in FIG. 2 can be used to provide an increased performance for downlink data delivery. According to FIG. 2, the mobile node 10 sends its home registration to the home agent 30 with its primary care-of-address CoA1 which is the care-of-address of a bi-directional interface IF1 shown in FIG. 3. According to FIG. 3, the mobile node 10 may also receive data from the IP network 40 via a unidirectional interface IF2.

FIG. 4A shows the initial situation in which a mobile node 10 is registered to its home agent 30 with its primary care-of-address CoA1. Packets sent to the mobile node 10 by the correspondent node 20 are tunneled by the home agent 30 to the mobile node 10 via the bi-directional interface IF1, as indicated by the arrow in FIG. 4A.

When the mobile node 10 detects the operational unidirectional interface IF2, it can configure a second care-of-address CoA2 for this interface. The detection may be based on a router advertisement (RA) received from a unidirectional access router (UAR) 50 via the unidirectional interface IF2 (cf. broken arrow in FIG. 2). It is assumed that the detection has led to the result that the received router advertisement indicates an operational unidirectional interface. Hence, the mobile node 10 can now receive data packets with a new care-of-address CoA2 of the unidirectional interface IF2. In case of a subsequent downlink delivery of packet data, packets initially sent to the mobile node 10 by the correspondent node 20 are tunneled by the home agent 30 to the mobile node 10 via the bi-directional interface IF1, as indicated by the double-lined arrows in FIG. 2. When the mobile node 10 receives tunneled packets, it may send a BU with its primary care-of-address CoA1 to the correspondent node 20 and after that the packets are routed directly from the correspondent node 20 to the mobile node 10 via the bi-directional interface IF1. However, when the mobile node 10 configures the new care-of-address CoA2 by sending a BU with its secondary care-of-address CoA2 of the unidirectional interface to the correspondent node 20, packets coming from the correspondent node 20 are routed directly to the mobile node 10 via the unidirectional interface IF2, as indicated by the dot-dashed arrows in FIG. 2, while the packets going from the mobile node 10 to the correspondent node 20 are routed through the bi-directional interface IF1.

FIG. 4B shows the above situation, where the mobile node 10 is configured as a multi-homed node which sends uplink data via the bi-directional interface IF1 and which receives downlink data via the unidirectional interface IF2 based on its secondary care-of-address CoA2. Thus, an improved performance of the downlink data delivery can be achieved.

If problems occur in the unidirectional channel, the IP network 40 may send a destination unreachable message to the correspondent node 20, and the correspondent binding of the mobile node 10 will be deleted. Then, the correspondent node 20 sends packets via the home agent 30 using the primary care-of-address CoA1. In this case, the mobile node 10 again receives packets tunneled through the bi-directional channel and may send a new BU with one of its care-of-addresses to the correspondent node 20. The mobile node 10 may also change the care-of-address used in the connection whenever it decides so by sending a new BU with a different care-of-address.

Moreover, the mobile node 10 may itself detect failures, e.g. a drop of the unidirectional link, and may act in a suitable manner, e.g. as explained above.

As regards the above preferred embodiment, it is to be noted that the detection of the unidirectional interface IF2 and the configuration of the corresponding secondary care-of-address CoA2 may as well be performed when the mobile node 10 is located at its home link. In this case, the care-of-address CoA2 relating to the unidirectional interface IF2 is configured at the correspondent node 20 without using the primary care-of-address CoA1. Thus, in this case, the initial binding update signaling in FIG. 2 is not required and the downlink data is not transmitted via the home agent 30.

The usage of the unidirectional interface IF 2 can be restricted by the UAR 50. To achieve this, the UAR 50 can maintain an access list at the edge of the unidirectional network. Since the UAR 50 is already known by its router advertisements, the mobile node 10 can authorize itself by sending a BU to the UAR 50. If the mobile node 10 receives an accepted binding acknowledgement (BA) from the UAR 50 via the unidirectional interface IF2, the unidirectional link can be considered to be functional and authorized to use. This authenticated BU may also be used to open a communication channel from the UAR 50 to the mobile node 10, i.e. to handle the AAA (Authorization, Authentication and Accounting) issues of the unidirectional network easier.

The home registration by the mobile node 10 always has to be performed with the primary care-of-address CoA1 of the bi-directional interface or network. The reason for this is to ensure reachability of the mobile node 10 and the fact that normally there is not much traffic between the home agent 30 and the mobile node 10. Only the first packets are tunneled by the home agent 30 in every connection with the correspondent node 20, and all other traffic between the home agent 30 and the mobile node 10 is considered to be quite insignificant.

The selection algorithm for the care-of-address may be implementation-specific. For example, it may derive information about the free bandwidth, the cost and/or the reliability of the connection from lower protocol layers. At IP level, the algorithm may use the information about the binding deletion in the correspondent node 20 before the lifetime has elapsed, which can be concluded from the received tunneled packets before the entry's lifetime in the binding update list has not elapsed. The IP network 40 may use a congestion information, e.g. a specific congestion flag C as a new flag in the advertisement, to inform mobile nodes about a congestion in the unidirectional network. This congestion flag C may be set e.g. when the free bandwidth is below a predefined threshold value, e.g. 64 kb. Additionally, information about the functionality of the IP network 40 and any other applicable information may be used in the router advertisements.

It is noted, that the present invention is not restricted to the specific preferred embodiment described above, but can be used in any packet data network having bi-directional and unidirectional interfaces or networks. The preferred embodiment may thus vary within the scope of the attached claims.

The invention claimed is:

1. A method of delivering data packets from a network node of a packet data network to a mobile node, said method comprising the steps of:
   a) detecting a unidirectional interface to said mobile node;
   b) deciding by said mobile node whether said unidirectional interface is to be used to deliver said data packets to said mobile node or not; and
   c) if it is decided in step b) that said unidirectional interface is to be used:
      c1) transmitting to said network node a binding update indicating a care-of-address, said care-of-address being- an address of said detected unidirectional interface; and
      c2) delivering said data packets via said unidirectional interface in response to said binding update.

2. A method according to claim 1, wherein another care-of-address associated with said mobile node while visiting a foreign link has been configured prior to said detection step, said other care-of-address being an address of a bi-directional interface to said mobile node.

3. A method according to claim 2, wherein said other care-of-address is configured as a primary care-of-address registered with the home agent of said mobile node.

4. A method according to claim 1, wherein said detecting step is based on a router advertisement.

5. A method according to claim 2, wherein said configuring step is performed using a Mobile IP protocol.

6. A method according to claim 1, further comprising the steps of sending a message indicating that said mobile node is unreachable if problems occur during said delivering step, deleting said binding by said care-of-address in response to said message, and delivering said data packets via the home agent of said mobile node.

7. A method according to claim 2, further comprising the step of transmitting a new binding update in order to change said other care-of-address.

8. A method according to claim 1, further comprising the step of maintaining an access list at said packet data network, said access list indicating allowed users of said unidirectional interface.

9. A method according to claim 8, further comprising the step of using an authenticated binding update procedure to open a communication channel between said mobile node and a unidirectional access router providing said unidirectional interface.

10. A method according to claim 9 further comprising the step of obtaining from a lower protocol layer an information about network parameters of said unidirectional interface.

11. A method according to claim 10, wherein said information comprise information about free bandwidth, costs and/or reliability of the connection via said unidirectional interface.

12. A method according to claim 11, further comprising the step of obtaining from a data packet delivered in said delivering step an information about a binding deletion in said network node.

13. A method according to claim 12, further comprising the step of adding a predetermined information to a router advertisement to inform said mobile node about unidirectionality and/or specific parameters of said unidirectional interface.

14. A method according to claim 13, wherein said specific parameters comprise a congestion information indicating a congestion situation.

15. A method according to claim 14, wherein a congestion flag is added to said router advertisement.

16. A method according to claim 15, further comprising the step of setting said congestion flag when the free bandwidth has dropped below a predetermined threshold.

17. A system for delivering data packets from a network node of a packet data network to a mobile node,
   a) wherein said mobile node is arranged to detect a unidirectional interface, to decide whether said unidirectional interface is to be used to deliver said data packets to said mobile node or not; and, if it has decided that said unidirectional interface is to be used; to transmit to said network node a binding update indicating a care-of-address, said care-of-address being an address of said detected unidirectional interface; and
   b) wherein said network node is arranged to deliver said data packets via said unidirectional interface, in response to said binding update.

18. A system according to claim 17, wherein said packet data network is an IP network.

19. A mobile node for receiving data packets from a packet data network, wherein said mobile node is arranged to detect a unidirectional interface to said mobile node, to decide whether said unidirectional interface is to be used to deliver said data packets to said mobile node or not; and, if it has decided that said unidirectional interface is to be used, to transmit to said packet data network a binding update indicating a care-of-address, said care-of-address being an address of said detected unidirectional interface.

20. A mobile node according to claim 19, wherein said mobile node is arranged to perform said configuration and transmission using a Mobile IP protocol signaling.

21. A mobile node according to claim 20, wherein said mobile node has configured another, care-of-address associated with said mobile node while visiting a foreign link, said other care-of-address being an address of a bi-directional interface to said mobile node.

22. A mobile node according to claim 21, wherein said mobile node is arranged to transmit a new binding update in order to change said other care-of-address.

* * * * *